(12) United States Patent
Iannotti et al.

(10) Patent No.: US 10,211,902 B1
(45) Date of Patent: Feb. 19, 2019

(54) TRUE TIME DELAY BEAM FORMER AND METHOD OF OPERATION

(71) Applicant: General Electric Company, Schenectady, NY (US)

(72) Inventors: Joseph Alfred Iannotti, Glenville, NY (US); Marco Francesco Aimi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/782,969

(22) Filed: Oct. 13, 2017

(51) Int. Cl.
| | |
|---|---|
| H04L 1/02 | (2006.01) |
| H04B 7/06 | (2006.01) |
| H01Q 3/26 | (2006.01) |
| H04B 7/08 | (2006.01) |

(52) U.S. Cl.
CPC ......... *H04B 7/0671* (2013.01); *H01Q 3/2682* (2013.01); *H04B 7/0617* (2013.01); *H04B 7/086* (2013.01)

(58) Field of Classification Search
CPC ....... H04L 1/0618; H04L 1/06; H04B 7/0417; H01P 9/00; H01Q 21/0031; H01Q 3/2683; H01Q 3/36
USPC .......................... 375/267, 260, 349; 342/375
See application file for complete search history.

(56) References Cited

U.S. PATENT DOCUMENTS

| | | | |
|---|---|---|---|
| 5,757,319 A * | 5/1998 | Loo ...................... | H01Q 3/2605 333/139 |
| 6,307,519 B1 | 10/2001 | Livingston et al. | |
| 6,650,291 B1 | 11/2003 | West et al. | |
| 2002/0075094 A1 | 6/2002 | Bechtle et al. | |
| 2003/0043071 A1 * | 3/2003 | Lilly ...................... | H01Q 3/22 342/368 |
| 2004/0246073 A1 * | 12/2004 | Zhou .................. | H03H 17/0009 333/164 |

(Continued)

FOREIGN PATENT DOCUMENTS

WO 2014142885 A1 9/2014

OTHER PUBLICATIONS

Jianqiang et al., "Research on Improving Lateral Resolution of Ultrasound Phases Array Elements by Using Sparse Matrix," Applied Mechanics and Materials, 2013 Trans Tech Publications, Switzerland, ISSN: 1662-7482, vols. 380-384, pp. 3409-3412.

(Continued)

*Primary Examiner* — Khai Tran
(74) *Attorney, Agent, or Firm* — Ziolkowski Patent Solutions Group, SC; Jean K. Testa (57) ABSTRACT

An antenna system includes a plurality of true time delay (TTD) modules, each having a plurality of switching elements configured to selectively define alternative RF signal transmission paths between a signal input and a signal output of the TTD module. A controller is programmed to control the plurality of TTD modules to steer a beam according to a make-before-break switching technique by closing a first pair of switching elements within at least a subset of the plurality of TTD modules to activate a first RF signal transmission path; closing a second pair of switching elements of the subset of the plurality of TTD modules to activate a second RF signal transmission path in parallel with the first RF transmission path; and opening the first pair of switching elements of the subset of TTD modules after closing the second pair of switching elements.

20 Claims, 8 Drawing Sheets

(56) References Cited

U.S. PATENT DOCUMENTS

| | | | |
|---|---|---|---|
| 2005/0068123 A1 | 3/2005 | Denatale et al. | |
| 2009/0027268 A1 | 1/2009 | Coward | |
| 2016/0006241 A1* | 1/2016 | Fitzgerald | H01H 59/0009 |
| | | | 361/13 |

OTHER PUBLICATIONS

Li et al., "The Design of Sparse Antenna Array," Institute of Electronics, Chiense Academics of Sciences, Beijing, China, 2008, pp. 1-3.
Bencivenni, "Sparse Array Synthesis of Complex Antenna Elements," Thesis, Department of Signals and Systems, Antenna Systems Division, Chalmers University of Technology, Goteborg, Sweden, 2015, pp. i-52
Collins, II, "Optimization of the Antenna Pattern of a Phases Array With Failed Elements," Thesis, Department of the Air Force, Air University, Air Force Institute of Technology, Wright-Patterson Air Force Base, Ohio, Dec. 1986, pp. i-77.
Schaffner et al., "A Wideband Beam Switching Antenna Using RF MEMS Switches", IEEE Antennas and Propagation Society International Symposium, Jul. 8-13, 2001, pp. 658-661.
Shin et al., "Optical True Time-Delay Feeder for X-band Phased Array Antennas Composed of 2×2 Optical MEMS Switches and Fiber Delay Lines", IEEE Photonics Technology Letters, vol. 16, No. 5, May 2004, pp. 1364-1366.
Liang et al., "MEMS Based True Time Delay Technology for Phased Antenna Array Systems", Proceedings of Asia-Pacific Microwave Conference 2007, Dec. 1-14, 2007, pp. 1-4.
Dey et al., "Reliability Analysis of Ku-Band 5-bit Phase Shifters Using MEMS SP4T and SPDT Switches", IEEE Transactions on Microwave Theory and Techniques, vol. 63, No. 12, Dec. 2015, pp. 3997-4012.

* cited by examiner

TRUE TIME DELAY BEAM FORMER AND METHOD OF OPERATION

GOVERNMENT LICENSE RIGHTS

This invention was made with Government support under grant number FA9453-09-C-0305 awarded by the Air Force Research Laboratories. The Government has certain rights in the invention.

BACKGROUND OF THE INVENTION

Embodiments of the invention relate generally to true time delay (TTD) beam formers for an electrically steerable array antenna or phased array antenna, and more particularly to TTD beam formers including TTD modules incorporating radio frequency (RF) micro-electromechanical systems (MEMS) switches controlled by a combination of make-before-break and sparse array methodologies.

Electronically steered antenna (ESA) systems or phased array antenna (PAA) systems combine the signals from multiple stationary antenna elements to point a beam of radio waves at a certain angle in space. The characteristics and angle of the beam is controlled in a manner that electronically steers the beam in different directions without physically moving the antennas. The electronic beam steering in a phased array antenna is often accomplished in one of two ways: through the use of phase shifters or true time delay devices. TTD beam steering differs from a phase shifter type approach in the inherent bandwidth of the device and the fact that the device imparts a time delay rather than a phase shift. These distinctions allow the TTD device to be used in very wideband applications for forming antenna beams and nulls. This is advantageous for electronic warfare systems and broadband communication applications.

Beam steering via TTD is accomplished by changing the excitation time of each antenna element. A TTD module is fabricated with high speed switches coupled to transmission lines of various lengths. The amount of time it takes for a signal to be transmitted between the electronics and the antenna is controlled by selecting a particular combination of transmission lines, which imparts a desired amount of time delay on the RF signal. Selection of the transmission lines may be accomplished using different types of switching elements such as RF MEMS switches, which provide beneficial isolation and insertion loss properties that are advantageous for implementing in TTD applications. These RF MEMS switches use an electrically actuated mechanical movement to achieve an open circuit or a closed circuit in a RF transmission line. When the RF MEMS device is in an on position, the RF transmission line is "closed" and in the RF signal path. When the RF MEMS device is in an off position, the RF transmission line is "open," and the RF transmission line is isolated from the RF signal path.

In TTD modules, RF MEMS switches may be actuated and de-actuated using an operational mode called hot switching. Hot switching occurs when an RF MEMS switch is actuated from the off position to the on position while a large voltage potential exists across the terminals of the RF MEMS switch or when an RF MEMS switch is de-actuated from the on position to the off position while a large current is flowing through the closed contacts of the RF MEMS switch. In either instance of hot switching, micro arcing occurs at the RF MEMS switch contacts, which exacerbates the degradation of the material and, therefore, the lifetime of the contacts. It is highly challenging and very costly to try to change the metallurgy or other structural features of an RF MEMS switch to improve hot switching performance. Thus, while hot switching allows a TTD module to remain "hot" and conduct an RF signal at all times, hot switching is still an undesirable mode of operation because of the increased risk of RF MEMS switch failure. This is particularly problematic for transmit arrays where the RF signals are often orders of magnitude higher in signal amplitude than in receive arrays.

RF MEMS switches can also be controlled according to another operational mode called cold switching. In cold switching, the RF input to the RF MEMS switches is shut off before the RF MEMS switches are actuated or de-actuated. Since the RF MEMS switches are operated when they are not conducting RF signals, operating the RF MEMS switches will not produce any micro arcing or significantly degrade the RF MEMS switches like operating the RF MEMS switches during hot switching. After the RF MEMS switches have been actuated or de-actuated, the RF signal is again supplied to the RF MEMS switches. Despite the added protection to RF MEMS switches provided by cold switching, cold switching is also undesirable because the RF input signal has to be entirely shut down for cold switching to be performed. Thus, the TTD module is not able to supply an output signal during the switching period. Moreover, this method would add substantial circuit complexity and cost as one has to selectively disable the RF path from each TTD module prior to changing the state of the TTD modules. A simpler approach would be to shut off the RF input to a large number of TTD modules and change the state of all the TTD modules at the same time. However, this approach would cause severe degradation of the antenna beam pattern.

Therefore, it would be desirable to actuate the switching elements of a TTD module using an operational mode that improves the reliability and lifetime of the switching elements without shutting down the input signal to the TTD module.

BRIEF DESCRIPTION OF THE INVENTION

In accordance with one aspect of the invention, an antenna system includes a plurality of TTD modules. Each TTD module has a plurality of switching elements configured to selectively define alternative RF signal transmission paths between a signal input of the TTD module and a signal output of the TTD module. The antenna system also includes a controller programmed to control the plurality of TTD modules to steer a beam by closing a first pair of switching elements within at least a subset of the plurality of TTD modules to activate a first RF signal transmission path; closing a second pair of switching elements of the subset of the plurality of TTD modules to activate a second RF signal transmission path, the second RF signal transmission path in parallel with the first RF transmission path; and opening the first pair of switching elements of the subset of TTD modules after closing the second pair of switching elements.

In accordance with another aspect of the invention, a method of steering a beam includes operating a plurality of TTD modules in a first state by activating a first RF transmission path between an RF signal input and an RF signal output of the TTD modules. In addition, the method includes activating a second RF transmission path between the RF signal input and the RF signal output of a first subset of the plurality of TTD modules while the first RF transmission path of the first subset of TTD modules remains active to transition the first subset of the plurality of TTD modules into an intermediate state, the second RF transmission path in parallel with the first delay line. Furthermore, the method includes de-activating the first RF transmission path of the first subset of TTD modules to operate the first subset of TTD modules in a second state.

In accordance with yet another aspect of the invention, a beam forming system includes an antenna comprising a plurality of antenna elements and a plurality of die constructed to transmit a TTD signal to the plurality of antenna element. Each die includes a plurality of switches selectively controllable in a first state wherein a first RF transmission path is activated, an intermediate state wherein the first RF transmission path and a second RF transmission path in parallel with the first RF transmission path are activated, and a second state wherein the second RF transmission path is activated and the first RF transmission path is de-activated. The beam forming system further includes a controller programmed to control a first subset of the plurality of die to transition from the first state to the intermediate state and transition from the intermediate state to the second state, and after the first subset of the plurality of die transition to the second state, sequentially control a plurality of additional subsets of the plurality of die to transition from the first state to the intermediate state and transition from the intermediate state to the second state.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide a control system for a beam former for steering a beam in an application such as a phased array antenna (PAA) system or electrically steerable antenna (ESA) system. The beam former includes an antenna with a plurality of antenna elements and a plurality of TTD modules corresponding to the plurality of antenna elements. Each TTD module has a plurality of switches or switching elements or devices that are selectively actuated and de-actuated by the control system according to a make-before-break and a sparse matrix control strategy. To move, morph, or steer a beam output by the antenna elements, the control system selectively controls switching elements of a set or subset of the overall number of TTD modules to activate or close additional delay lines within the TTD modules according to a sparse matrix of the antenna elements and TTD modules to transition the subset of TTD modules from a first operational state to an intermediate state. Once the parallel delay lines have been activated, the control system controls the switching elements of the subset of the TTD modules to de-activate or open the original or initial delay lines through the subset of the TTD modules to transition the subset of TTD modules to a second operational state. The controller then performs the same operation with switches of additional subsets of the TTD modules until the beam is steered to point in the desired direction. Activating parallel signal transmission paths in this manner prevents micro arcing from occurring upon opening and closing the switching elements without removing the signal input to the TTD modules. Further, performing the method on only a subset of the TTD modules ensures that the beam maintains an International Telecommunications Union (ITU) compatible radiation pattern during the steering procedure.

Figure 1:
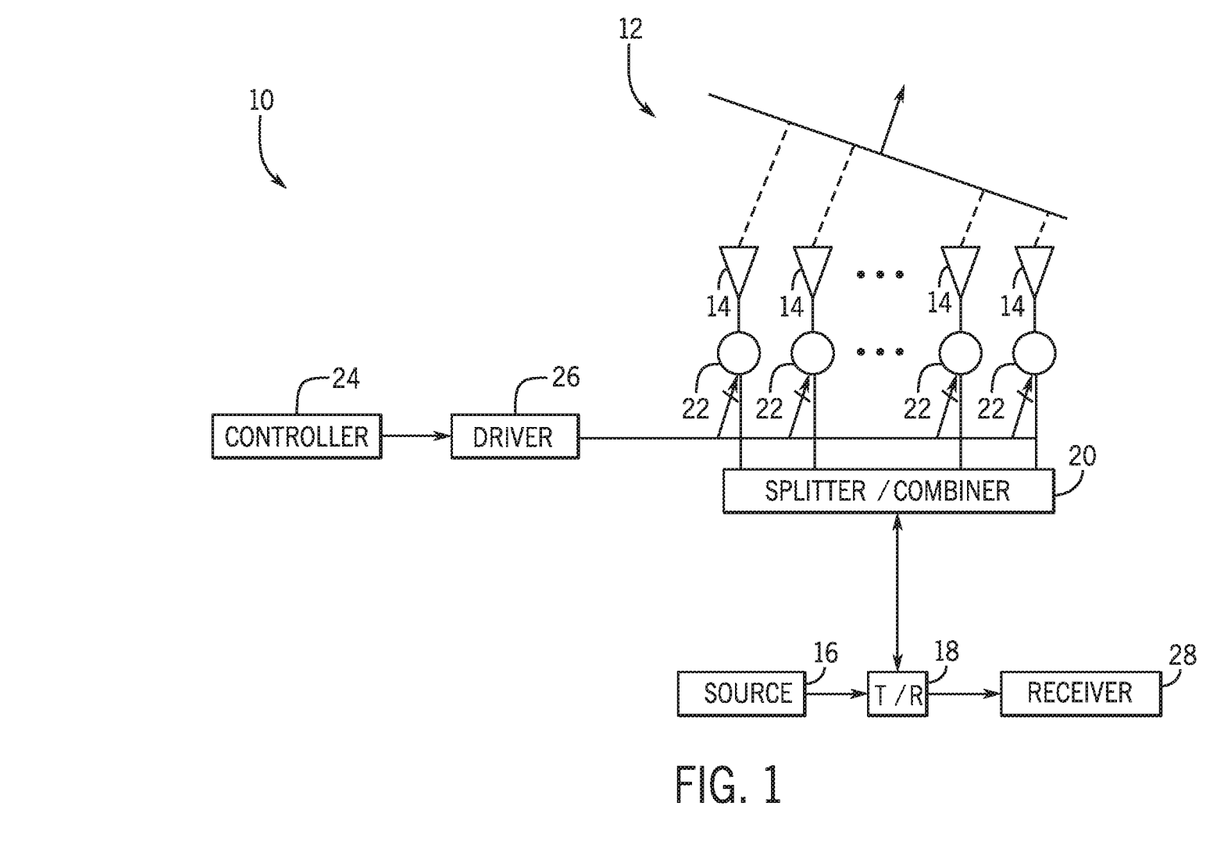
FIG. 1 is a simplified schematic diagram of an antenna system with a phased array antenna having beam steering effected with TTD.

Referring first to FIG. 1, a simplified schematic diagram of a passive electrically steerable antenna or beam forming system or beam former 10 is illustrated according to an embodiment of the invention. In one non-limiting embodiment, antenna system 10 is a radar system. Antenna system 10 includes an antenna 12 constructed of multiple radiating elements 14 for transmitting and receiving signals. These radiating antenna elements 14 are fed by a source 16 that provides an RF feed or input such as, for example, an RF modulated signal having a predetermined wavelength. This RF input is transmitted by a transmit/receive switch 18 through a splitter/combiner 20 to a true time delay (TTD) beam former or module 22 corresponding to each antenna element 14. A controller or control system 24 provides drive signals to a driver die 26, which selectively controls switching elements within the TTD modules 22 in a manner that generates a time delayed signal output from each TTD module 22. Each TTD module 22 outputs its time delayed signal to a respective antenna element 14. Signals received by antenna elements 14 are transmitted through splitter/combiner 20 to a receiver 28.

While not specifically illustrated in FIG. 1, it is contemplated that embodiments of the invention may be configured for active steerable antennas including independent beam control of the vertical and horizontal polarizations and separate beam controlling circuitry for each polarization. In addition, while FIG. 1 shows only four antenna elements 14 and four corresponding TTD modules 22, it is contemplated that antenna 12 may include hundreds or thousands of antenna elements 14 and corresponding TTD modules 22 so as to enable the use of complex RF feeding schemes. A greater number of antenna elements 14 and TTD modules 22 may also allow for effective operation even if some are inoperable or intermittent.

Figure 2:
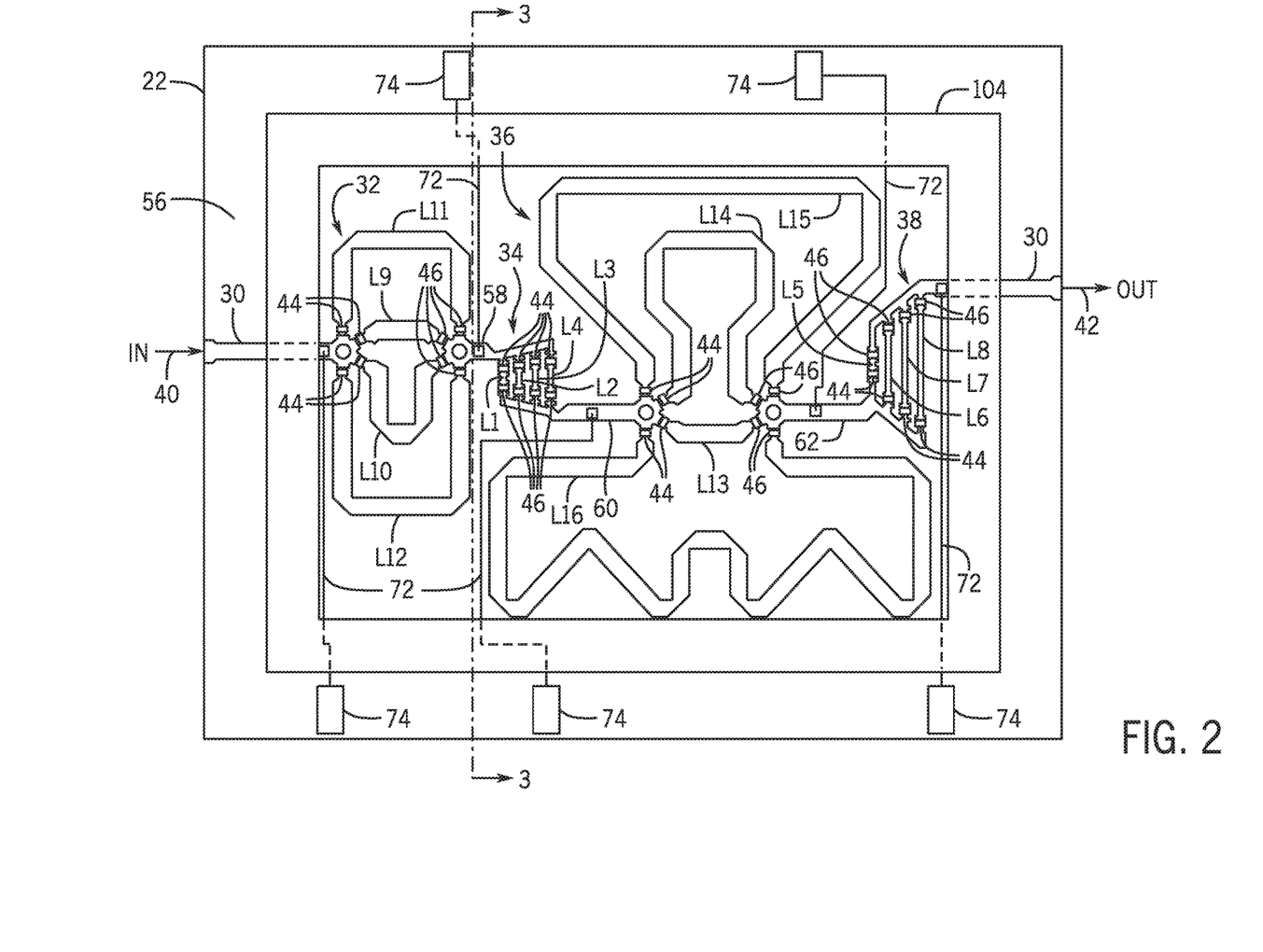
FIG. 2 is a schematic top view of a TTD module useable with the antenna system of FIG. 1, according to one embodiment of the invention.

FIG. 2 is a schematic top view of a TTD module 22 incorporated in antenna system 10 of FIG. 1, according to one embodiment of the invention. TTD module 22 includes a micro-strip transmission line or signal line 30 patterned on a base substrate 56 to include four (4) sets of time delay stages 32, 34, 36, 38. Micro-strip transmission line 30 is formed using a deposition, patterning, and/or etching technique as known in the art. In a preferred embodiment, base substrate 56 is formed of fused silica, which provides reduced current leakage and improved switch channel isolation. According to alternative embodiments, base substrate 56 may be an insulating, semi-insulating material, or semiconductive material such as, but not limited to glass, alumina, quartz, polyimide, gallium arsenide, silicon, or germanium. Alternatively, base substrate 56 may be a semiconductor wafer processed to include switches or switching elements or devices 44, 46 and micro-strip transmission line 30.

Micro-strip transmission line 30 may be any conductive material such as, for example, copper, gold, a tungsten/nickel/gold stack, or another common packaging material. As shown, micro-strip transmission line 30 is patterned such that delay stages 32, 34, 36, 38 are serially connected, with first delay stage 32 coupled to an RF signal input 40 of TTD module 22 and fourth delay stage 38 coupled to an RF signal output 42 of TTD module 22. Each of delay stages 32, 34, 36, 38 includes an input electronic switching element 44 and an output electronic switching element 46 that are selectively controlled in either their on or off positions to insert a cumulative time delay in a transmission signal sent to the respective antenna element 14 (FIG. 1), as described in additional detail below. While elements 40 and 42 are described herein as input and output, respectively, it is contemplated that the functionality of elements 40, 42 might be reversed such that element 40 is an RF signal output and element 42 is an RF signal input. Similarly, it is to be understood that switching elements 44 and 46 function as respective "input" and "output" switching elements of respective micro-strip delay lines L1-L16 when an RF signal travels through TTD module 22 from RF signal element 40 to RF signal element 42 and as "output" and "input" switching elements, respectively, when the signal travels in the reverse direction.

First delay stage 32 includes four micro-strip time delay lines L9-L12 patterned on base substrate 56 of TTD module 22. The delay lines within each delay stage have different lengths that impart different time delays to RF input signal 40. The phase of the transmission signal is shifted in proportion to the time delay imparted by the respective delay lines. Second, third, and fourth delay stages 34, 36, 38 are formed in a similar manner as first delay stage 32, with delay stage 34 including micro-strip time delay lines L1-L4, delay stage 36 including micro-strip time delay lines L13-L16, and delay stage 38 including micro-strip time delay lines L5-L8 of varying lengths patterned on base substrate 56.

TTD module 22 is shown in FIG. 2 as a monolithic TTD module in which all of micro-strip delay lines L1-L16 are positioned entirely on substrate 56. In other words, each micro-strip delay line L1-L16 is an on-chip delay line. However, in some embodiments, some or all of micro-strip delay lines L1-L16 may be off-chip delay lines, meaning that all or a portion of a respective delay line is formed off of substrate 56 and at a location outside the TTD module 22, such as, for example, a package structure that the TTD module 22 is coupled to. These off-chip delay lines would function similar to the on-chip delay lines described above (i.e., selectively couple RF input 40 with RF output 42), but could be significantly longer than the on-chip delay lines. In one non-limiting embodiment, an off-chip delay line may include an off-chip portion formed outside TTD module 22 and a pair of on-chip portions, with a first on-chip portion coupling one of switches 44 and to a first end of the off-chip portion and a second on-chip portion coupling one of switches 46 to a second end of the off-chip portion. The connections between the first and second on-chip portions and the respective first and second ends of the off-chip portion would be made by an applicable connection element such as, for example, a bond pad formed on substrate 56. In another embodiment, an off-chip delay line may be formed such that no portion of the off-chip delay line is patterned on substrate 56. In such case, the off-chip delay line might be coupled directly to switches 44, 46 through substrate 56 or a protective cap or lid 102 further described below with respect to FIG. 3.

Referring again to FIG. 2, line segments 58, 60, 62 interconnect delay stages 32-38. Additional phase shift is imparted to RF input signal 40 by each subsequent delay stage 34-38 by selectively closing a given pair of switches 44, 46 on one of the four micro-strip delay lines while the remaining pairs of switches 44, 46 are maintained in an open position in a similar manner as described above. Switching devices 44, 46 are positioned on base substrate 56 at the terminal input and terminal output, respectively, of each micro-strip delay line L1-L16. In embodiments where switches 44, 46 are MEMS devices, the switches 44, 46 are formed using a build-up technique involving multiple deposition, anodization, patterning, and etching steps. In alternative embodiments, switching elements 44, 46 may be shunt switches, FET switches, or prefabricated switching elements coupled to base substrate 56 with a joining material such as an adhesive.

In the illustrated embodiment, micro-strip delay lines L9-L12 of first delay stage 32 and micro-strip delay lines L13-16 of third delay stage 36 are constructed having a star or fan out configuration and micro-strip delay lines 48-54 of second delay stage 34 and fourth delay stage 38 are constructed having a linear configuration. However, it is contemplated that the delay stages may be constructed having any number alternative configurations based on design specifications of a particular application.

TTD module 22 disclosed herein is designed as a 256 state beam former, with four (4) delay stages, and a 360 degree delay/phase-shift range. TTD module 22 is operable over the entire Ku-band or over a 10-15 GHz bandwidth. However, it is contemplated that the concepts disclosed herein may be extended to TTD modules having any number of delay stages, with the number of delay stages and the length of the individual delay lines within those stages determined based on the desired amount of delay and resulting beam steering resolution for a particular application. Likewise, while the dimensions of TTD module 22 disclosed herein are approximately 9 mm by 7.5 mm, a skilled artisan will recognize that the dimensions of TTD module 22 may be altered based on the design specifications of a particular application and/or frequency operating range.

Figure 4:
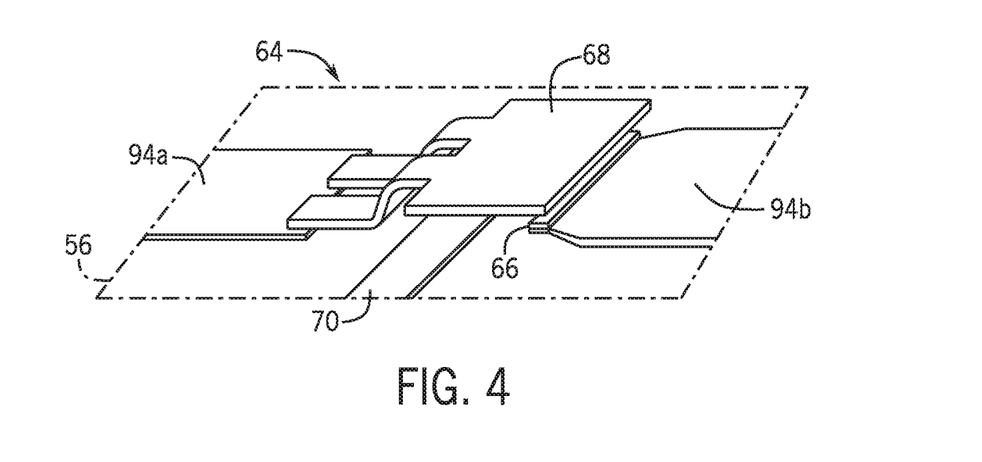
FIG. 4 is a schematic diagram of an exemplary electronic switching device usable in the TTD module of FIG. 2, according to one embodiment of the invention.

According to one embodiment of the invention, switches 44, 46 are provided as MEMS switches similar to MEMS switch 64 depicted in FIG. 4. MEMS switch 64 includes a contact 66 and a moveable element 68 such as for example, a cantilevered beam. In some embodiments, moveable element 68 can be supported by an anchor, which may be integrated with moveable element 68 and serve to connect moveable element 68 to an underlying support structure such as base substrate 56. In the illustrated embodiment moveable element 68 is a cantilevered beam that includes two cantilever portions connected to a common beam portion. However, it is contemplated that moveable element 68 may be configured having alternative geometries in other embodiments. Switch 64 also includes an electrode or driving means 70 that effects a potential difference between the electrode 70 and cantilevered beam 68. Contact 66, cantilevered beam 68, and electrode 70 are formed at least partially of at least one conductive material such as gold, gold alloy, nickel, nickel alloy, platinum, tantalum, and tungsten, as non-limiting examples.

As shown in FIG. 4, contact 66 and moveable element 68 of MEMS switch 64 are formed between two micro-strip lines 94a and 94b patterned on base substrate 56, with the electrode 70 positioned between micro-strip lines 94a and 94b. Switch 64 may be formed on base substrate 56 through a micro fabrication technique, such as, for example, vapor deposition, electroplating, photolithography, wet and dry etching, and the like, such that switch 64 constitutes a portion of a microelectromechanical device, nanoelectromechanical device, or MEMS. In such an embodiment, MEMS switch 64 is fabricated having features on the order of ones or tens of micrometers or nanometers.

When appropriately charged, electrode 70 of MEMS switch 64 generates an electrostatic force that pulls cantilevered beam 68 toward electrode 70 and contact 66. Electrode 70 thus acts as a gate with respect to MEMS switch 64, causing the cantilevered moveable element 68 to move between a non-contacting, off, or open position in which moveable element 68 is separated from contact 66 (shown in FIG. 4), and a contacting, on, or closed position in which moveable element 68 contacts and establishes electrical communication with contact 66, thereby closing a circuit between micro-strip lines 94a and 94b.

Referring again to FIG. 2, switches 44, 46 of TTD module 22 are ohmic contact switch mechanisms similar to that shown in FIG. 4, in one embodiment of the invention. In alternative embodiments, TTD module 22 may include alternative types of MEMS switching devices, including capacitive contact or shunt switch mechanisms. Alternatively, it is contemplated that TTD module 22 may be fabricated with switching devices that employ other switch actuation techniques, including without limitation, thermal, piezoelectric, electromagnetic, gas bubble, Lorenz force, surface tension, combinations thereof, or any other actuation method known in the art.

A given delay line, such as delay line L15 of third delay stage 36 for example, is activated by closing input switch 44 and output switch 46 on delay line L15. The MEMS switches 44, 46 of TTD module 22 are controlled to move between their open and closed positions by applying a selective gate voltage to the electrode 70 of the MEMS switch 44, 46. This gate voltage is provided through gating lines 72 (FIG. 2) patterned on base substrate 56. Gating lines 72 electrically couple MEMS switches 44, 46 to gate voltage sources or gate drivers 74 (FIG. 2). Similar to transmission line 30, gating lines 72 can be fabricated using microfabrication techniques such as, for example, vapor deposition, electroplating, photolithography, wet and dry etching, and the like. While some gate drivers 74 and their corresponding gating lines 72 are omitted from FIG. 2 for purposes of clarity, it will be understood that each of the MEMS switches 44, 46 of TTD module 22 is coupled to respective gating lines and drivers. TTD module 22 also includes power sources (not shown) that are coupled to the micro-strip lines and establish a potential difference between contact 66 and cantilevered beam 68 of MEMS switches 44, 46 when they are in the open position.

Figure 3:
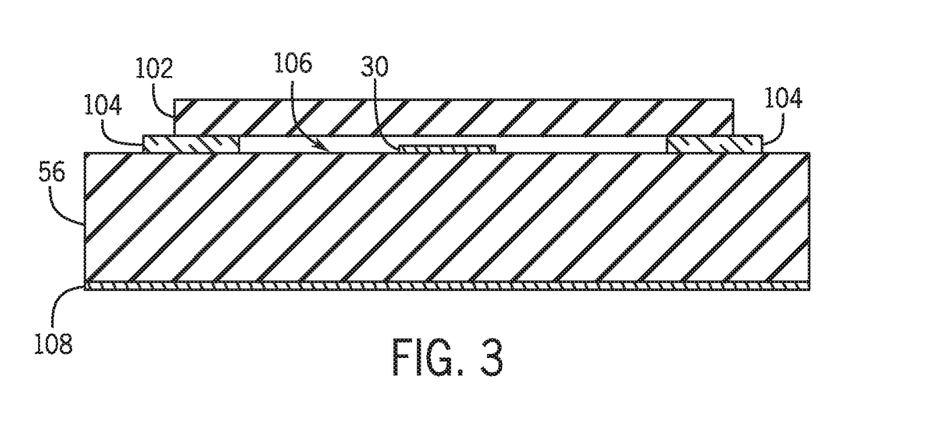
FIG. 3 is a cross sectional view of the TTD module of FIG. 2 taken along line 3-3.

Referring now to FIG. 3, TTD module 22 further includes a protective cap or lid 102, which is omitted from FIG. 2 for purposes of illustrating the underlying micro-strip transmission line 30. After micro-strip transmission line 30 and switching elements 44, 46, 78, 80, 82 are formed on base substrate 56, cap 102 is bonded to base substrate 56 with an intervening layer of sealing material 104 such as, for example, solder, glass frit, or gold. The four first delay stages 32-38 and associated switching elements 44, 46, 78, 80, 82 are enclosed and vacuum or hermetically sealed within a cavity 106 formed between cap 102 and base substrate 56. Cavity 106 may be filled with a dielectric medium such as, for example, but not limited to air or a dielectric gas such as nitrogen. TTD modules 22 including cap 102 may be packaged as individual modules corresponding to each antenna element 14 or as a wafer-level package including multiple TTD modules 22 sealed within a wafer-level cap (not shown).

The illustrated TTD module 22 is configured with an embedded micro-strip configuration with a ground layer 108 provided below the base substrate 56 as shown in FIG. 3. However, it is contemplated that TTD module 22 may be fabricated having alternative grounding configurations, such as, for example a grounded coplanar waveguide configuration wherein two ground lines (not shown) are provided coplanar to the micro-strip transmission line 30 on the base substrate 56. In yet another alternative embodiment, TTD module 22 is constructed with an inverted ground plane (not shown) that is positioned above the anchor 30 and base substrate 56 in a similar manner as described in Ser. No. 14/839,402, which is incorporated by reference in its entirety. In such an embodiment, the width, length, and routing pattern of the transmission line 30 may be altered and the overall die size would be reduced.

Figure 5:
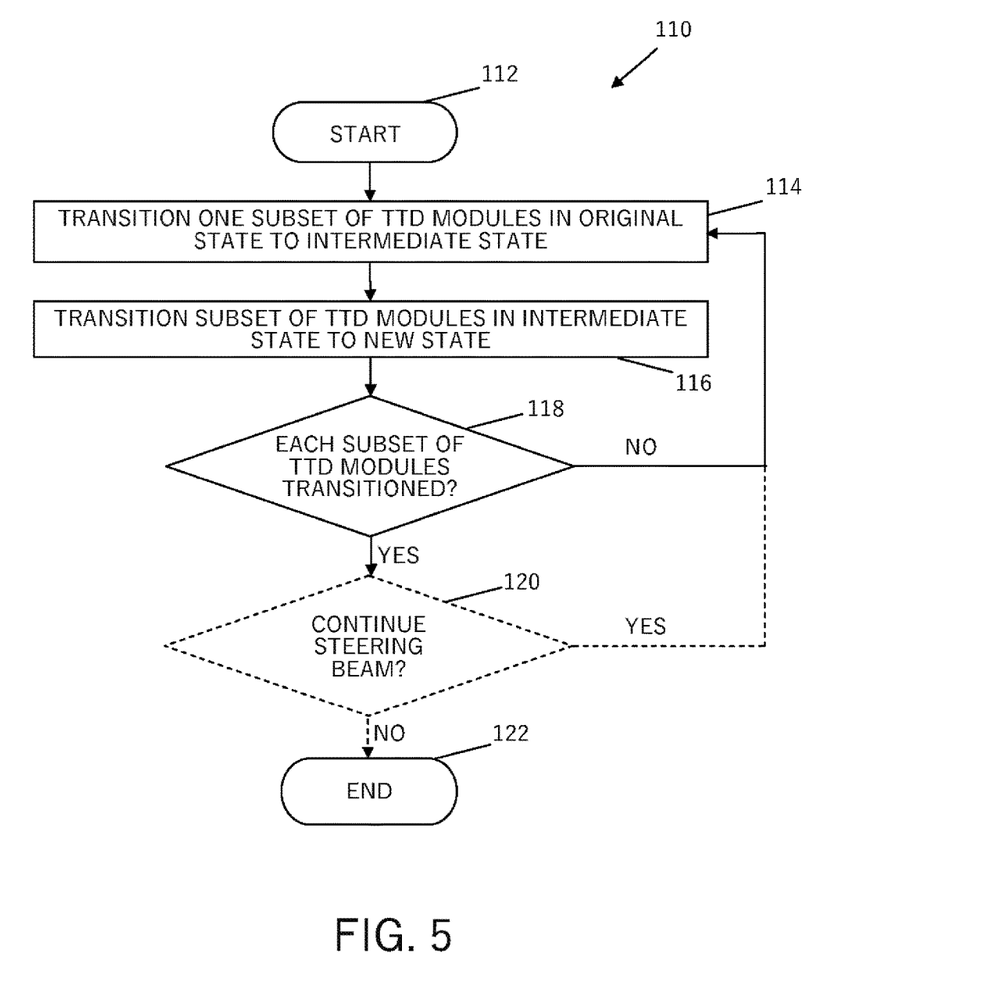
FIG. 5 is a flowchart illustrating a technique for steering a beam using the antenna system of FIG. 1, according to an embodiment of the invention.

Referring now to FIG. 5, with reference back to the structural components illustrated in FIGS. 1 and 2 as appropriate, a technique or process 110 for steering a beam using an antenna system, such as, for example, antenna system 10 of FIG. 1, is shown according to an embodiment of the invention. Process 110 is described herein as being performed by controller 24 in antenna system 10. However, process 110 may be performed by another controller or control system of a different antenna system or beam former in alternative embodiments. In process 110, controller 24 steers a beam formed by the antenna system using a sparse matrix or array control strategy, wherein select predefined subsets of the TTD modules 22 are sequentially controlled to transition the TTD modules 22 between two different beam operational states. Beam steering is accomplished by morphing the pointing vector of the antenna system 10 from one discrete location to another over time based on a random update sequence. A sparse matrix update technique is used to define and control this random update sequence of TTD modules 22 based on an acceptable degradation of the overall beam profile while the beam moves, as described in more detail below.

During the beam-steering operation, the controller 24 uses a make-before-break switching technique to selectively operate switches 44, 46 (FIG. 2) of the one of the subsets TTD modules 22 of antenna system 10 and thereafter carries out the switching technique on the remaining subsets of TTD modules 22 in a sequential fashion. The make-before-break switching technique transitions TTD modules 22 from a first operational beam state to an intermediate state where two parallel delay lines are active simultaneously in at least one delay stage 32-38 before transitioning to a second operational beam state. The use of this operational process 110 allows controller 24 to form or output a beam at antenna 12 and steer that beam without completely deactivating any TTD modules 22 and without micro arcing occurring while actuating or de-actuating switches 44, 46 of TTD modules 22.

To form a beam, controller 24 controls each TTD module 22 to be in the first operational state wherein a first RF signal transmission path along transmission line 30 is activated between the RF signal input 40 and RF signal output 42 of the respective TTD modules 22. The first signal transmission path is defined by closing one pair of input and output switches 44, 46 in each time delay stage 32-38 (FIG. 2). In order to steer the beam formed by antenna system 10, controller 24 implements the make-before-break switching technique rather than implementing a hot or cold switching operational mode. Using the make-before-break switching technique, controller 24 activates a second time delay line in at least one delay stage 32-38 of TTD modules 22 before de-activating or opening the already active first time delay line in the delay stage(s) 32-38 to transition TTD modules 22 into the intermediate state wherein a second RF signal transmission path between the RF signal input 40 and RF signal output 42 is activated in parallel with the first RF signal transmission path. Controller 24 accomplishes this by closing a second pair of switches 44, 46 in each appropriate delay stage 32-38 in parallel with the first pair of switches 44, 46, which remains closed. Only after the second pair of switches 44, 46 are closed will controller 24 open the first pair of switches 44, 46, thereby transitioning the TTD module 22 from the intermediate state into the second operational state, in which only the second RF signal transmission path is activated between the RF signal input 40 and RF signal output 42 of the respective TTD modules 22.

Figure 6A:
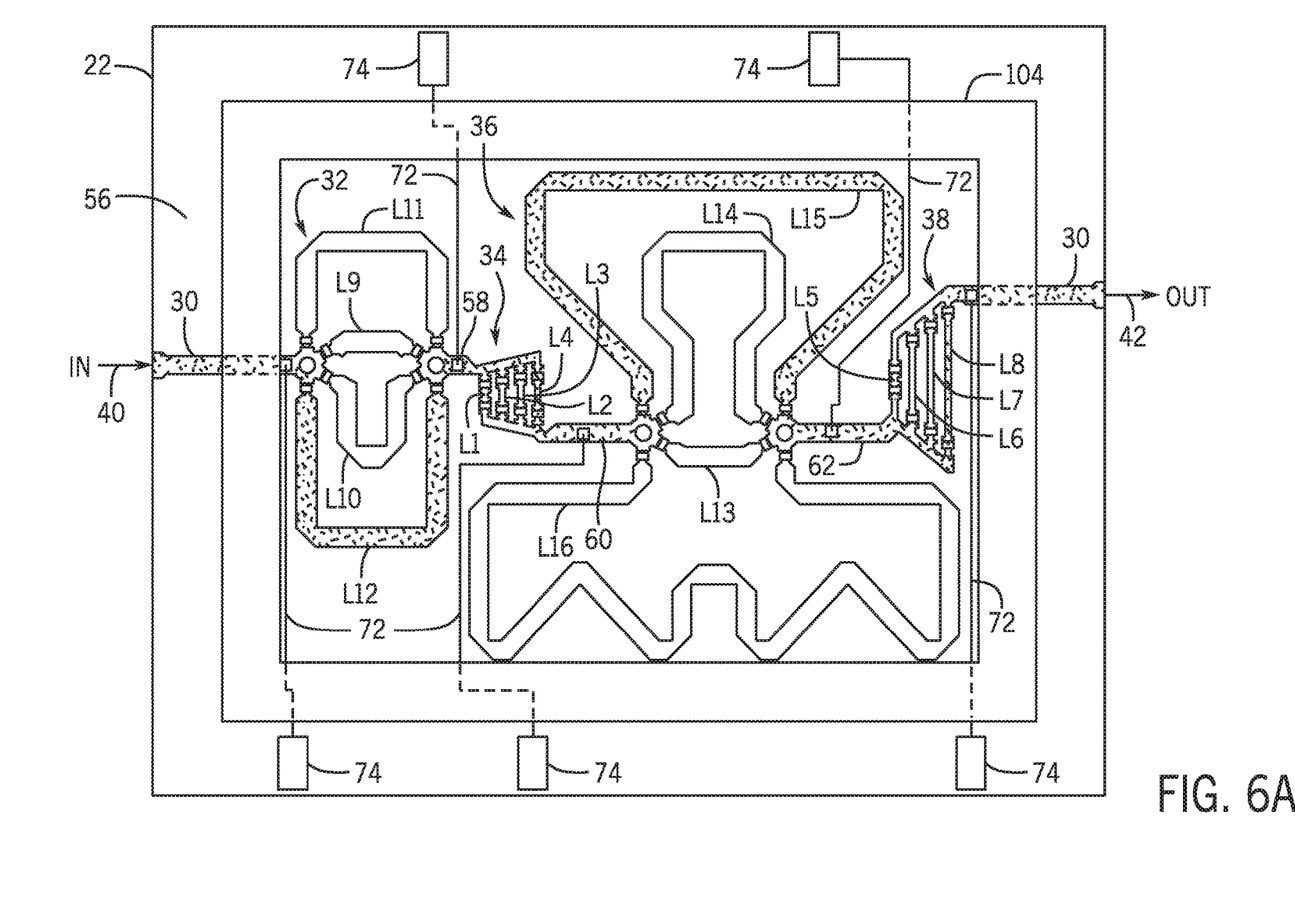
FIGS. 6A-6C illustrate an exemplary transition of the TTD module of FIG. 2 between a first beam state, an intermediate state, and a second beam state, according to an embodiment of the invention.
Figure 6B:
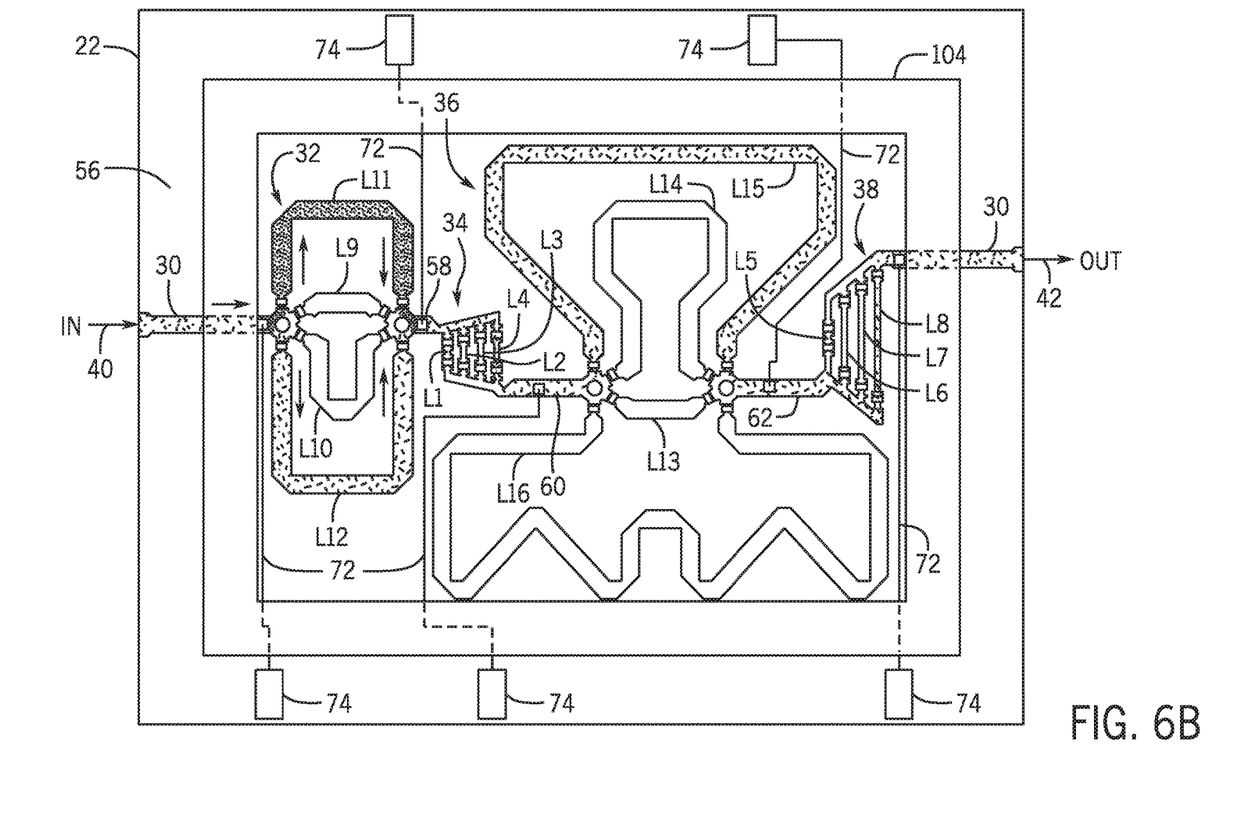
Figure 6C:
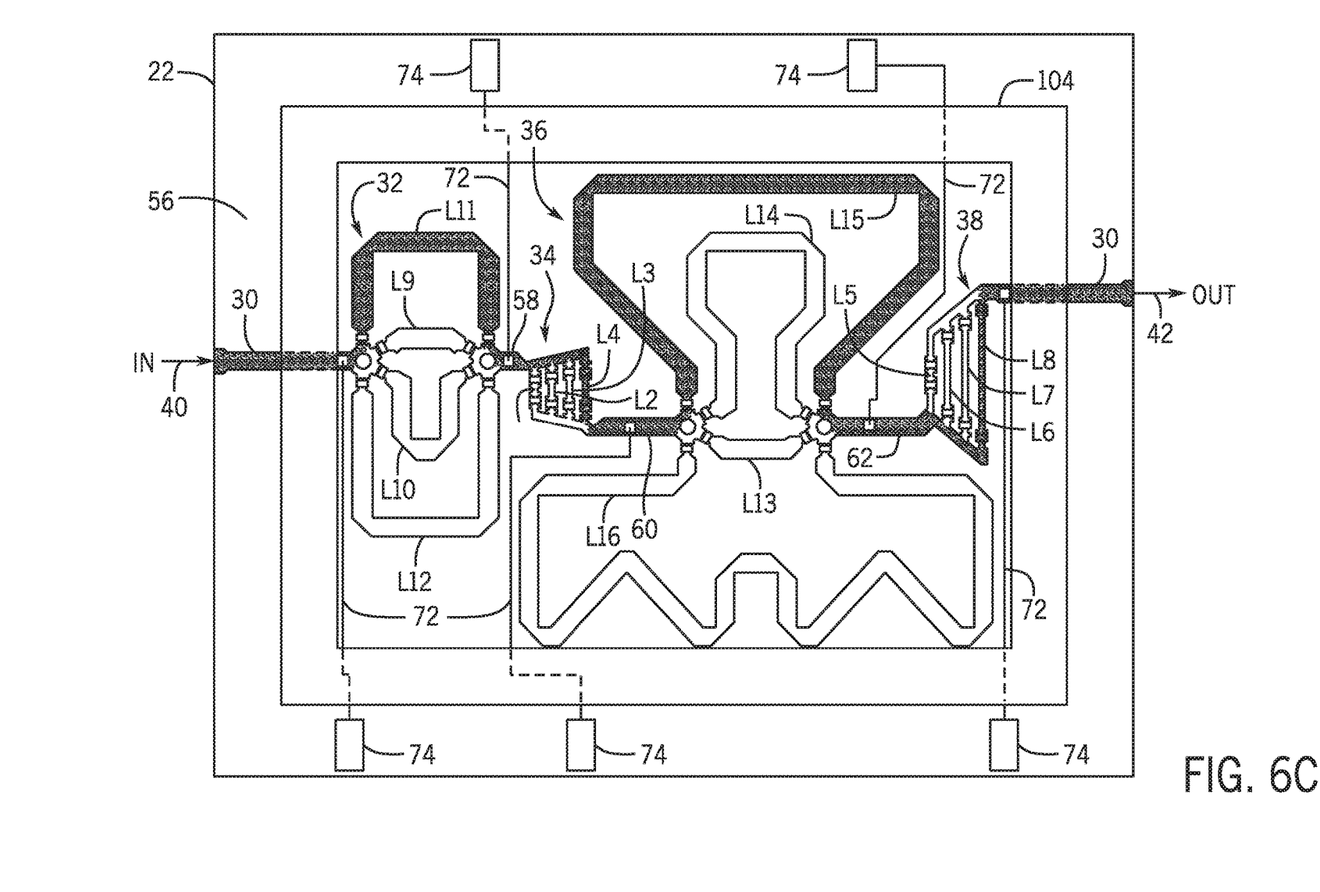

Thus, controller 24 transitions each TTD module 22 from the first operational state to the second operational state via the intermediate state in which parallel time delay lines 48-54 are active at the same time. In making the transition, controller 24 may activate parallel time delay lines 48-54 in one or more delay stages 32-38 of each TTD module 22 depending on the current position of the beam and desired position of the beam. An exemplary transition from the first beam state, to the intermediate state, and then to the second beam state is illustrated in FIGS. 6A-6C. TTD module 22 is depicted in a first beam state in FIG. 6A, with delay line L12 of stage 32, delay line L4 of stage 34, delay line L15 of stage 36, and delay line L8 of stage 38 active to define a first signal transmission path between the RF input 40 and RF output 42. In the intermediate state illustrated in FIG. 6B, delay line L11 of stage 32 is activated in parallel with delay line L12. Delay lines L4, L15, and L8 of stages 34, 36, and 38 remain active. After a predetermined period of time delay line L12 is deactivated, thereby defining a second signal transmission path between the RF input 40 and RF output 42 that passes through delay lines L11, L4, L15, and L8 as depicted in FIG. 6C.

Activating one delay line in parallel with the previously activated delay line of the same delay stage transitions the TTD modules 22 into the intermediate state and mitigates damage associated with a hot switching operational mode. By closing the second set of switches 44, 46 while the first set remains closed, the switching operation mitigates micro arcing by eliminating the large voltage potential that would exist between the terminals of the second set of switches 44, 46 if the first set was open. The potential for micro arcing is further reduced because the total current flow is divided between the parallel delay line segments, resulting in a smaller current flow through each of the parallel delay lines.

While the make-before-break switching technique mitigates damage to switches 44, 46 due to micro arcing, activating two time delay line segments 48-54 in parallel causes TTD modules 22 to output an incorrect RF signal to their respective antenna elements 14 and therefore distorts the overall beam. To mitigate beam distortion caused by the make-before-break switching technique, controller 24 utilizes a sparse matrix control strategy to sequentially control select subsets of individual antenna elements 14 and their corresponding TTD modules 22 to transition from one state to another state.

Using the sparse matrix control strategy, controller 24 segments the total number of antenna elements 14 and their corresponding TTD modules 22 into a sparse matrix or array that includes a number of subsets of antenna elements 14 and their respective TTD modules 22. Each subset of antenna elements 14 and respective TTD modules 22 includes a specific number and arrangement of antenna elements 14 and TTD modules 22 that can be momentarily "lost" while they are outputting an incorrect or distorted RF signal, as antenna 12 continues to output a beam with an ITU compatible radiation pattern via control of the remaining subsets of antenna elements 14. Put another way, the sparse matrix control strategy permits the TTD modules 22 of one subset of antenna elements 14 to be steered according to the make-or-break switching technique while still maintaining an acceptable overall beam profile (i.e., an ITU compatible radiation pattern) with the remaining subsets of antenna elements 14.

Figure 7:
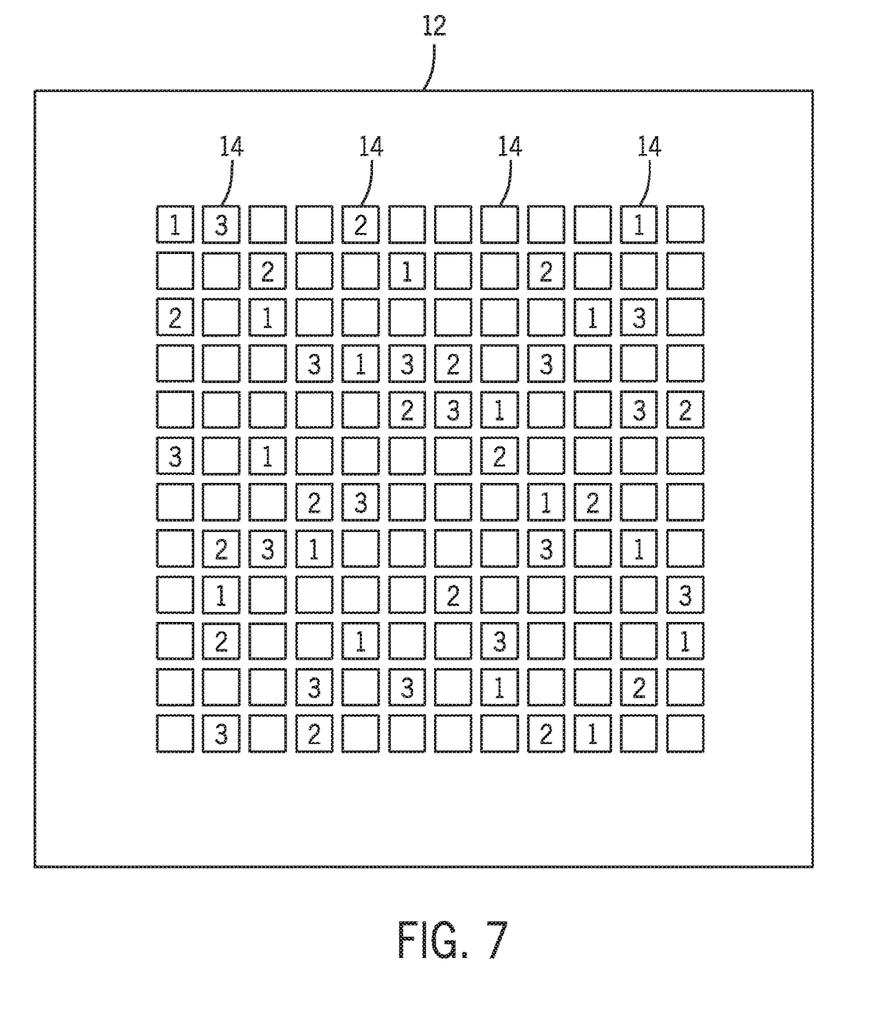
FIG. 7 is a non-limiting example of an arrangement of the phased array antenna of FIG. 1 with its antenna elements divided into different subsets, according to an embodiment of the invention.

FIG. 7 shows a non-limiting example of how antenna elements 14 of antenna 12 (FIG. 1) could be divided into the subsets of the sparse matrix array described above. In the example of FIG. 7, antenna 12 includes 144 antenna elements 14. Three different subsets of the 144 antenna elements 14 (and corresponding TTD modules 22) are shown in FIG. 7. A first subset of antenna elements 14 is labeled with a "1," a second subset of antenna elements 14 is labeled with a "2," and a third subset of antenna elements 14 is labeled with a "3." It is contemplated that the remaining, un-numbered antenna elements 14 and their corresponding TTD modules 22 would be divided into additional subsets in a similar manner. In the exemplary embodiment shown in FIG. 7, each of the first, second, and third subsets of antenna elements 14 includes a seemingly random arrangement of antenna elements 14. However, the particular location and arrangement of antenna elements 14 within each subset is determined based on a sparse matrix pattern that permits antenna elements 14 within a particular subset to output an incorrect signal when transitioning between two beam states while maintaining an acceptable level of beam functionality with the remaining subsets of antenna elements 14.

In one embodiment, controller 24 is programmed with a pre-defined and static sparse matrix pattern that defines number of subsets of TTD modules 22 and the particular assignment of each TTD module 22 to a particular subset. Alternatively, controller 24 may be provided with programming that permits the controller 24 to dynamically define the number of subsets and subset assignments based on the particulars of the desired beam and beam steering characteristics. Regardless of how the sparse matrix pattern is defined, the sparse matrix pattern defines a control strategy for the subsets of TTD modules 22 that maintains an acceptable beam quality in the overall array while steering the beam. Beam steering is then carried out by controller 24 implementing the make-before-break switching technique on only one predetermined subset of TTD modules 22 at a time according to the sparse matrix pattern until the beam formed at antenna 12 is steered to the correct position. As one non-limiting example, if each subset of TTD modules 22 includes 10% of the total number of TTD modules 22, the sparse matrix pattern would include 10 distinct settings that controller 24 would cycle through until the beam formed at antenna elements 14 is steered to the desired location.

Referring back to FIG. 5, process 110 starts at STEP 112, when controller 24 of antenna system 10 is directed to steer a beam formed at antenna elements 14. In order to do so, controller 24 transitions each TTD module 22 from its current or first operational state to a new or second operational state associated with the desired position of the beam. The current operational state of each TTD module 22 is defined by a first or original signal transmission path through micro-strip transmission line 30 (FIG. 2) formed by closing a first pair of switches 44, 46 in a time delay line of each delay stage 32-38. For example, the first signal transmission path through one or more TTD modules 22 may run from RF signal input 40, through time delay lines L12, L4, L15, and L8, and to RF signal output 42 as illustrated in FIG. 6A.

At STEP 114, controller 24 transitions a first predefined subset of TTD modules 22 from a current operational state to an intermediate state based on the preprogrammed sparse matrix pattern. The transition is carried out by closing one additional pair of switches 44, 46 in at least one delay stage 32-38 of each of the first subset of TTD modules 22 in order to activate a second RF signal transmission path in parallel with the first RF signal transmission path. Therefore, when the first subset of TTD modules 22 have been transitioned to the intermediate state, at least one delay stage 32-38 of each of the first subset of TTD modules 22 has two active, parallel time delay lines. In the example shown in FIG. 6B, time delay lines L11 and L12 are activated in parallel in the intermediate state. Depending on the desired beam steering, time delay lines in one or more other delay stages 34, 36, and 38 may also be activated in parallel with the other active delay line in that stage during the intermediate state.

At STEP 116, after the first subset of TTD modules 22 have been transitioned to the intermediate state, controller 24 de-activates any first time delay lines 48-54 in parallel with the newly activated second time delay lines 48-54 such that the first subset of TTD modules 22 moves into a second or new operational state. Once the first subset of TTD modules 22 has been transitioned to the new operational state, only the second RF signal transmission path remains active therein. In the example shown in FIG. 6C, delay line L12 would be de-activated at STEP 116, thereby defining the signal transmission path through L11, L4, L15, and L8.

At STEP 118, controller 24 determines whether every additional predefined subset of TTD modules 22 has been transitioned from their current states to new states according to the sparse matrix control strategy. If not, controller 24 repeats STEPS 114, 116 with each of the remaining subsets of TTD modules 22 in order to steer the beam to point in the desired direction. For example, process 110 may return to STEP 114, in which controller 24 transitions a second subset of TTD modules 22 to an intermediate state in order to continue to steer the beam. Then, at STEP 116, controller 24 transitions the second subset of TTD modules 22 into a new state with a newly active second signal transmission path. Controller 24 will repeat STEPS 114, 116 until each subset of TTD modules 22 has been transitioned to a new state to steer the beam to point in the desired direction.

In some embodiments, process 110 includes optional STEP 120, in which controller 24 determines whether to continue steering the beam by repeating STEPS 114-118. Optional STEP 120 may be used to incrementally steer the beam to its desired final position rather than accomplishing the entire beam shift in a single shift of each TTD module 22 from one beam state to another. Using this incremental steering strategy, controller 24 cycles through the subsets of TTD modules multiple times before reaching a final state corresponding to the desired beam direction. Optionally, controller 24 may utilize the sparse matrix control strategy to dynamically define a different sequence of shifting the different subsets of TTD modules 22 and/or a different assignment of individual TTD modules 22 within those subsets for each incremental shift of the beam. Thus, controller 24 can implement STEP 120 to incrementally steer the beam to its final position instead of making a substantial directional change at once. However, regardless of whether process 110 includes STEP 120, process 110 ends at STEP 122 with the beam is pointing in the desired direction.

In order to improve the transitions between the different operational states of TTD modules 22, controller 24 may implement a pre-emphasis switching technique. The pre-emphasis switching technique takes into account the time delay between sending a gate activation signal to open or close a pair of switches 44, 46 and the actual open or closing of that pair of switches 44, 46. This time delay is used to minimize the time that the parallel pairs of switches 44, 46 are simultaneously closed. For example, in a non-limiting embodiment, a 4 microsecond time delay may occur between sending the gate activation signal and closing the second pair of switches 44, 46 while a 100 nanosecond time delay may occur between sending the gate activation signal and actually opening the first pair of switches 44, 46. In that example, instead of transmitting an open signal to the first pair of switches 44, 46 after the second pair of switches 44, 46 closes, controller 24 may use a pre-emphasis switching technique to transmit the open gate signal to the first pair of switches 44, 46 some time before that, such as, for example, 90 nanoseconds. If controller 24 were to signal the first pair of switches to open 90 nanoseconds before the second pair of switches 44, 46 is closed, the two pairs of switches would only be closed at the same time for 10 nanoseconds instead of 100 nanoseconds. Thus, the pre-emphasis switching technique reduces the time that the parallel sets of switches 44, 46 are closed at the same to reduce the amount of time that TTD modules 22 are non-functional.

Beneficially, embodiments of the invention thus provide a TTD beam former for broadband frequency signal processing applications. The TTD beam former includes a plurality of antenna elements and respective TTD modules along with a controller that controls switches in the TTD modules. The controller controls the switches to activate signal transmission paths through the TTD modules via a plurality of time delay lines. Once the controller operates the switches to form a beam at the antenna elements, the controller steers the beam using a make-before-break switching technique and a sparse matrix control strategy. The controller transitions the TTD modules from one operational state to another operational state by closing switches of parallel time delay lines. In activating these parallel time delay lines, micro arcing across the terminals of the switches is mitigated since a large voltage potential does not exist across the terminals upon closing and a smaller current flows through the switches upon opening. Furthermore, the controller activates these parallel delay lines in one subset of the TTD modules at a time according to a sparse matrix pattern. The sparse matrix pattern allows a specific arrangement of the TTD modules to momentarily output an incorrect signal at any given time such that the parallel delay lines can be activated in the subsets of the TTD modules without significantly impairing the overall beam pattern of the beam. Thus, the combination of the make-before-break switching technique and sparse matrix control strategy implemented by the controller allows the TTD beam former to operate continuously without shutting down the input feed to the TTD modules, exacerbating the degradation of the switches of the TTD modules, or rendering the beam formed at the antenna elements non-functional.

According to one embodiment of the invention, an antenna system includes a plurality of TTD modules. Each TTD module has a plurality of switching elements configured to selectively define alternative RF signal transmission paths between a signal input of the TTD module and a signal output of the TTD module. The antenna system also includes a controller programmed to control the plurality of TTD modules to steer a beam by closing a first pair of switching elements within at least a subset of the plurality of TTD modules to activate a first RF signal transmission path; closing a second pair of switching elements of the subset of the plurality of TTD modules to activate a second RF signal transmission path, the second RF signal transmission path in parallel with the first RF transmission path; and opening the first pair of switching elements of the subset of TTD modules after closing the second pair of switching elements.

According to another embodiment of the invention, a method of steering a beam includes operating a plurality of TTD modules in a first state by activating a first RF transmission path between an RF signal input and an RF signal output of the TTD modules. In addition, the method includes activating a second RF transmission path between the RF signal input and the RF signal output of a first subset of the plurality of TTD modules while the first RF transmission path of the first subset of TTD modules remains active to transition the first subset of the plurality of TTD modules into an intermediate state, the second RF transmission path in parallel with the first delay line. Furthermore, the method includes de-activating the first RF transmission path of the first subset of TTD modules to operate the first subset of TTD modules in a second state.

According to yet another embodiment of the invention, a beam forming system includes an antenna comprising a plurality of antenna elements and a plurality of die constructed to transmit a TTD signal to the plurality of antenna element. Each die includes a plurality of switches selectively controllable in a first state wherein a first RF transmission path is activated, an intermediate state wherein the first RF transmission path and a second RF transmission path in parallel with the first RF transmission path are activated, and a second state wherein the second RF transmission path is activated and the first RF transmission path is de-activated. The beam forming system further includes a controller programmed to control a first subset of the plurality of die to transition from the first state to the intermediate state and transition from the intermediate state to the second state, and after the first subset of the plurality of die transition to the second state, sequentially control a plurality of additional subsets of the plurality of die to transition from the first state to the intermediate state and transition from the intermediate state to the second state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An antenna system comprising:
   a plurality of true time delay (TTD) modules, each TTD module comprising a plurality of switching elements configured to selectively define alternative RF signal transmission paths between a signal input of the TTD module and a signal output of the TTD module; and
   a controller programmed to control the plurality of TTD modules to steer a beam by:
      closing a first pair of switching elements within at least a subset of the plurality of TTD modules to activate a first RF signal transmission path;
      closing a second pair of switching elements of the subset of the plurality of TTD modules to activate a second RF signal transmission path, the second RF signal transmission path in parallel with the first RF transmission path; and
      opening the first pair of switching elements of the subset of TTD modules after closing the second pair of switching elements.

2. The antenna system of claim 1 wherein the controller is further programmed to control the plurality of TTD modules according to a sparse matrix control strategy.

3. The antenna system of claim 1 wherein the switching elements of the plurality of TTD modules comprise microelectromechanical systems (MEMS) switches.

4. The antenna system of claim 1 wherein each TTD module includes 256 operational states.

5. The antenna system of claim 1 further comprising an antenna in communication with the signal outputs of the plurality of TTD modules.

6. The antenna system of claim 5 wherein, while the first and second pairs of switching elements of the subset of TTD modules are both closed, the antenna maintains an International Telecommunications Union (ITU) compatible radiation pattern.

7. The antenna system of claim 1 wherein the controller is further programmed to steer the beam by:
   controlling a first subset of TTD modules to activate a first RF transmission path, activate a second RF transmission path in parallel with the first RF transmission path, and thereafter deactivate the first RF transmission path in parallel with the second RF transmission path; and
   subsequently controlling a second subset of TTD modules to activate a first RF transmission path, activate a second RF transmission path in parallel with the first RF transmission path, and thereafter deactivate the first RF transmission path in parallel with the second RF transmission path.

8. The antenna system of claim 1 wherein the controller is further programmed to transmit an open signal to the first pair of switching elements before the second pair of switching elements closes.

9. A method of steering a beam comprising:
   operating a plurality of true time delay (TTD) modules in a first state by activating a first RF transmission path between an RF signal input and an RF signal output of the TTD modules;

activating a second RF transmission path between the RF signal input and the RF signal output of a first subset of the plurality of TTD modules while the first RF transmission path of the first subset of TTD modules remains active to transition the first subset of the plurality of TTD modules into an intermediate state, the second RF transmission path in parallel with the first RF transmission path; and de-activating the first RF transmission path of the first subset of TTD modules to operate the first subset of TTD modules in a second state.

10. The method of claim 9 wherein activating the first and second RF transmission paths and de-activating the first RF transmission path comprises actuating and de-actuating pairs of micro-electromechanical systems (MEMS) switches, each pair corresponding to a respective time delay line.

11. The method of claim 10 further comprising maintaining at least a second subset of the plurality of TTD modules in the first state while transitioning the first subset of TTD modules between the first state, the intermediate state, and the second state.

12. The method of claim 9 further comprising:
after de-activating the first RF transmission path within the first subset of TTD modules, activating a second RF transmission path between the RF signal input and the RF signal output of a second subset of the plurality of TTD modules while the first RF transmission path of the second subset of TTD modules remains active; and
de-activating the first RF transmission path of the second subset of TTD modules to operate the second subset of TTD modules in a second state.

13. The method of claim 9 further comprising controlling the TTD modules to transition between the first state, the intermediate state, and the second state according to a sparse matrix pattern.

14. The method of claim 9 further comprising transmitting gate activation signals to switching elements of the plurality of TTD modules according to a pre-emphasis technique to minimize the duration of the intermediate state.

15. The method of claim 9 wherein activating the second RF transmission path comprises activating two parallel time delay lines in at least two time delay stages of the first subset of TTD modules.

16. A beam forming system comprising:
an antenna comprising a plurality of antenna elements;
a plurality of die constructed to transmit a true time delayed (TTD) signal to the plurality of antenna elements, each die comprising a plurality of switches selectively controllable in a first state wherein a first RF transmission path is activated, an intermediate state wherein the first RF transmission path and a second RF transmission path in parallel with the first RF transmission path are activated, and a second state wherein the second RF transmission path is activated and the first RF transmission path is de-activated; and
a controller programmed to:
control a first subset of the plurality of die to transition from the first state to the intermediate state and transition from the intermediate state to the second state; and
after the first subset of the plurality of die transition to the second state, sequentially control a plurality of additional subsets of the plurality of die to transition from the first state to the intermediate state and transition from the intermediate state to the second state.

17. The beam forming system of claim 16 wherein the plurality of die comprise a plurality of time delay stages, with each time delay stage comprising a plurality of delay lines.

18. The beam forming system of claim 16 wherein the plurality of die are assigned to the plurality of subsets according to a sparse matrix pattern.

19. The beam forming system of claim 16 wherein the controller is further programmed to sequentially control the plurality of additional subsets of the plurality of die by:
controlling a second subset of the plurality of die to transition from the first state to the intermediate state and transition from the intermediate state to the second state; and
after the second subset of the plurality of die transition to the second state, controlling a third subset of the plurality of die to transition from the first state to the intermediate state and transition from the intermediate state to the second state.

20. The beam forming system of claim 16 wherein the switches of each die comprise micro-electromechanical systems (MEMS) switches.

* * * * *